Figure 3:
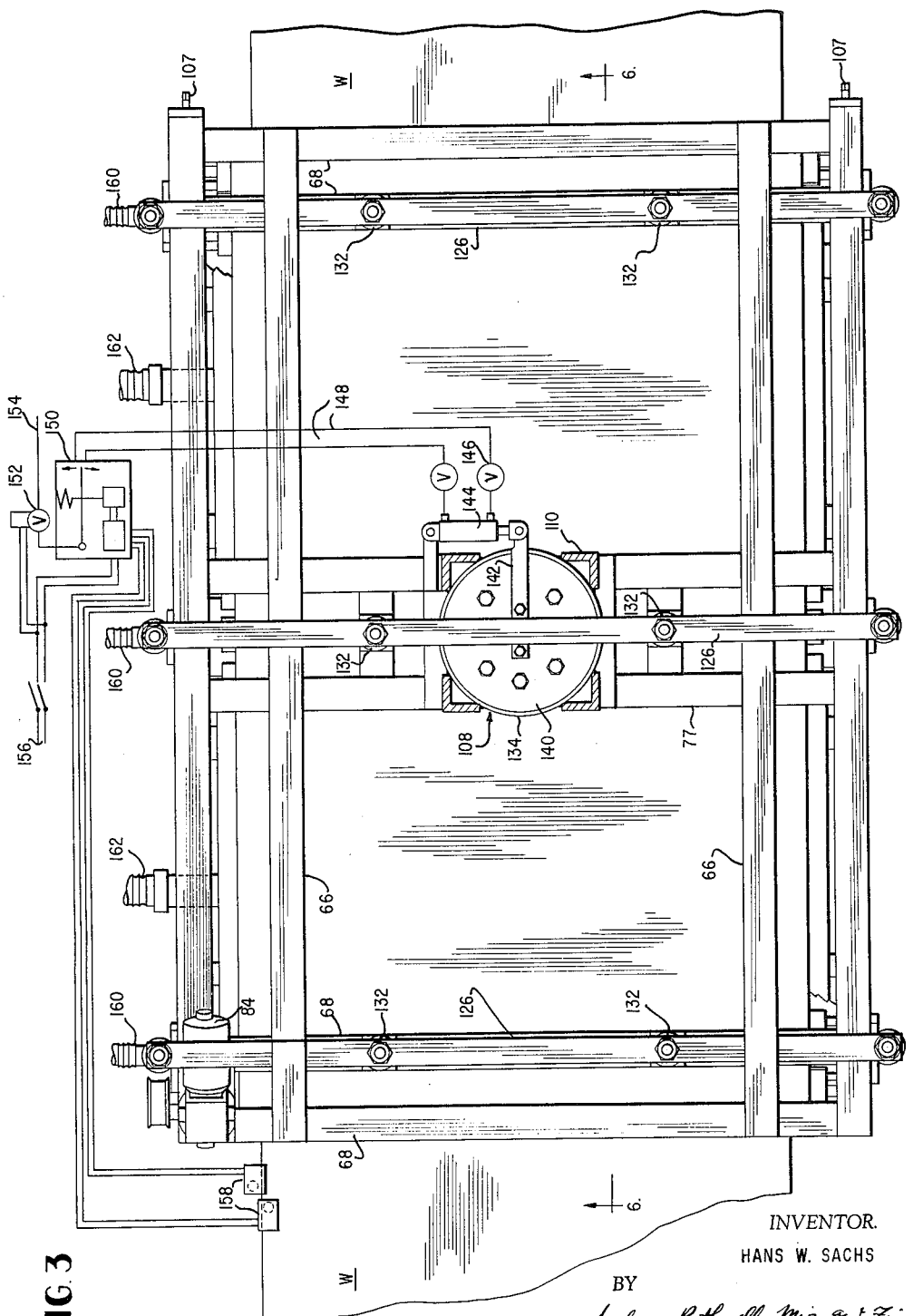

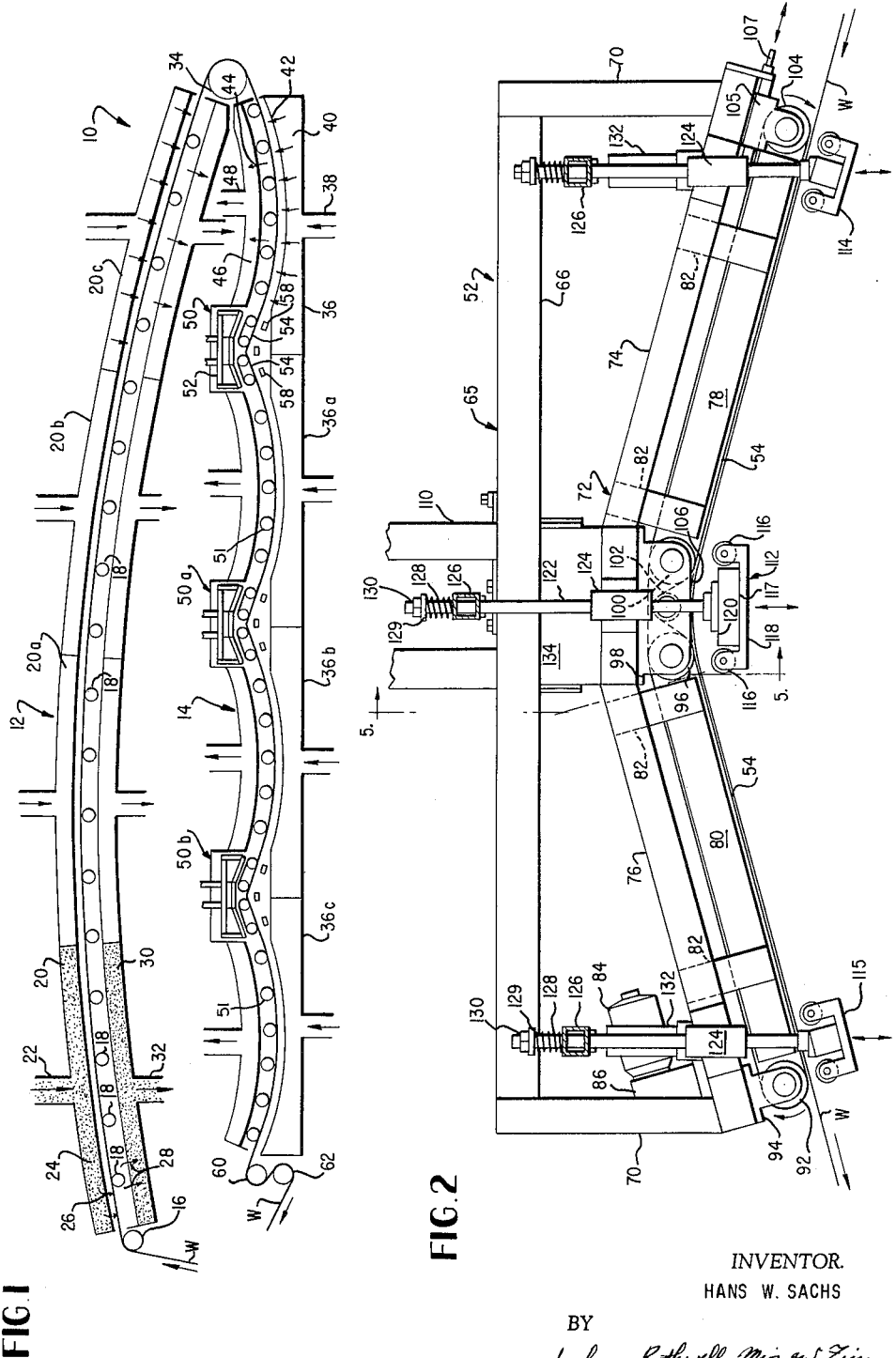

INVENTOR.
HANS W. SACHS
BY
Hughes, Rothwell, Mion and Zinn
ATTORNEYS

Jan. 25, 1966   H. W. SACHS   3,230,634
ARTICULATED CATENARY RETURN DRYING TUNNEL WITH
TWIN SUCTION BLANKET DRIVE
Filed Oct. 11, 1962   8 Sheets-Sheet 3

INVENTOR.
HANS W. SACHS
BY
Sughrue, Rothwell, Mion and Zinn
ATTORNEYS

Jan. 25, 1966    H. W. SACHS    3,230,634
ARTICULATED CATENARY RETURN DRYING TUNNEL WITH
TWIN SUCTION BLANKET DRIVE
Filed Oct. 11, 1962    8 Sheets-Sheet 4
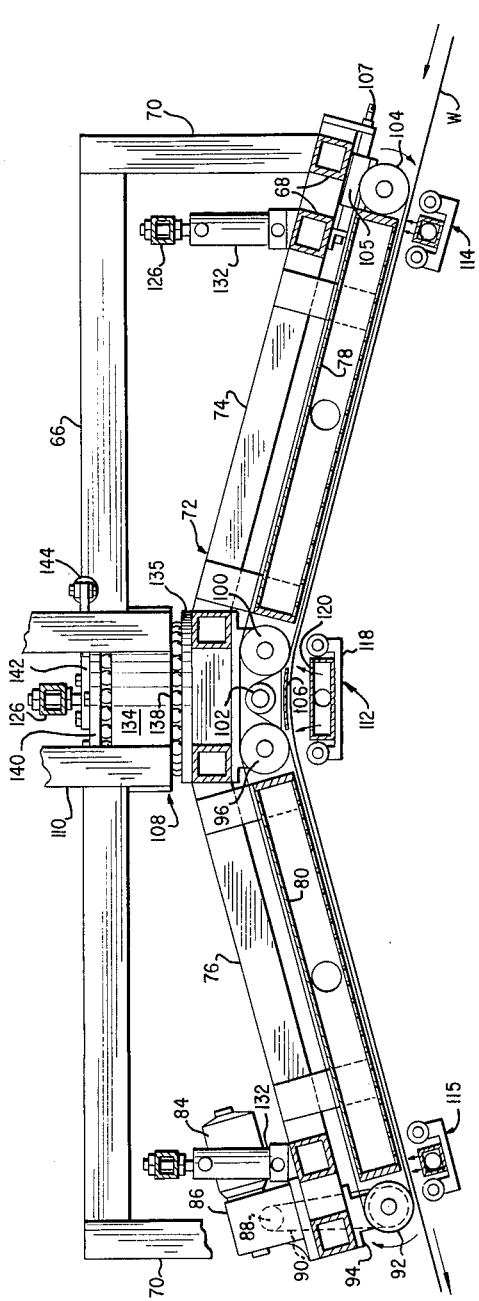
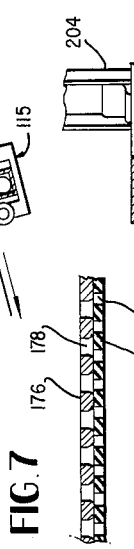
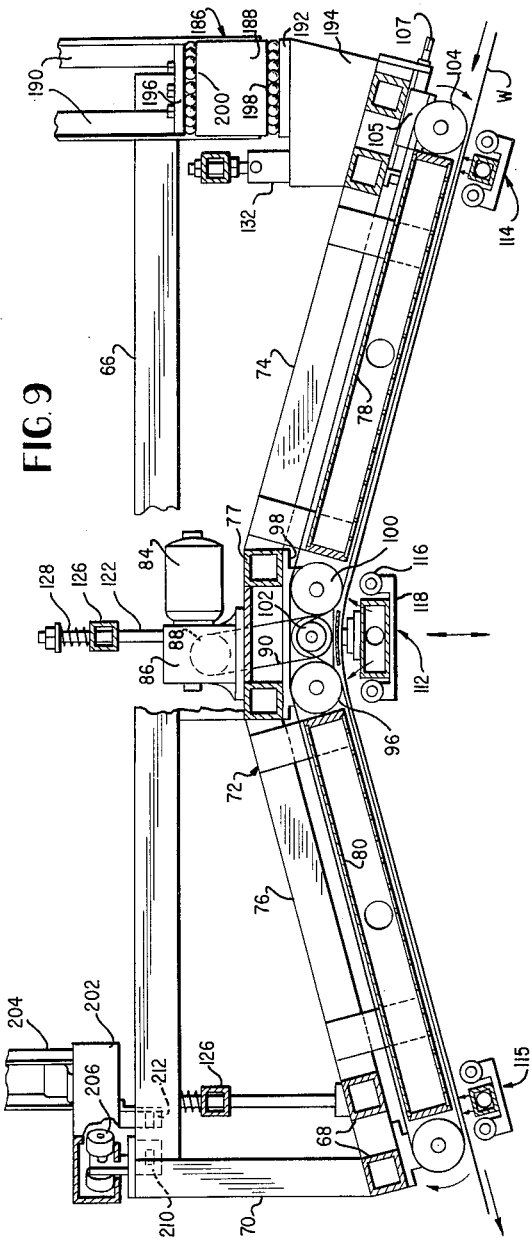
INVENTOR.
HANS W. SACHS
BY
Sughrue, Rothwell, Mion and Zinn
ATTORNEYS INVENTOR.
HANS W. SACHS
BY
Sughrue, Rothwell, Mion and Zinn
ATTORNEYS

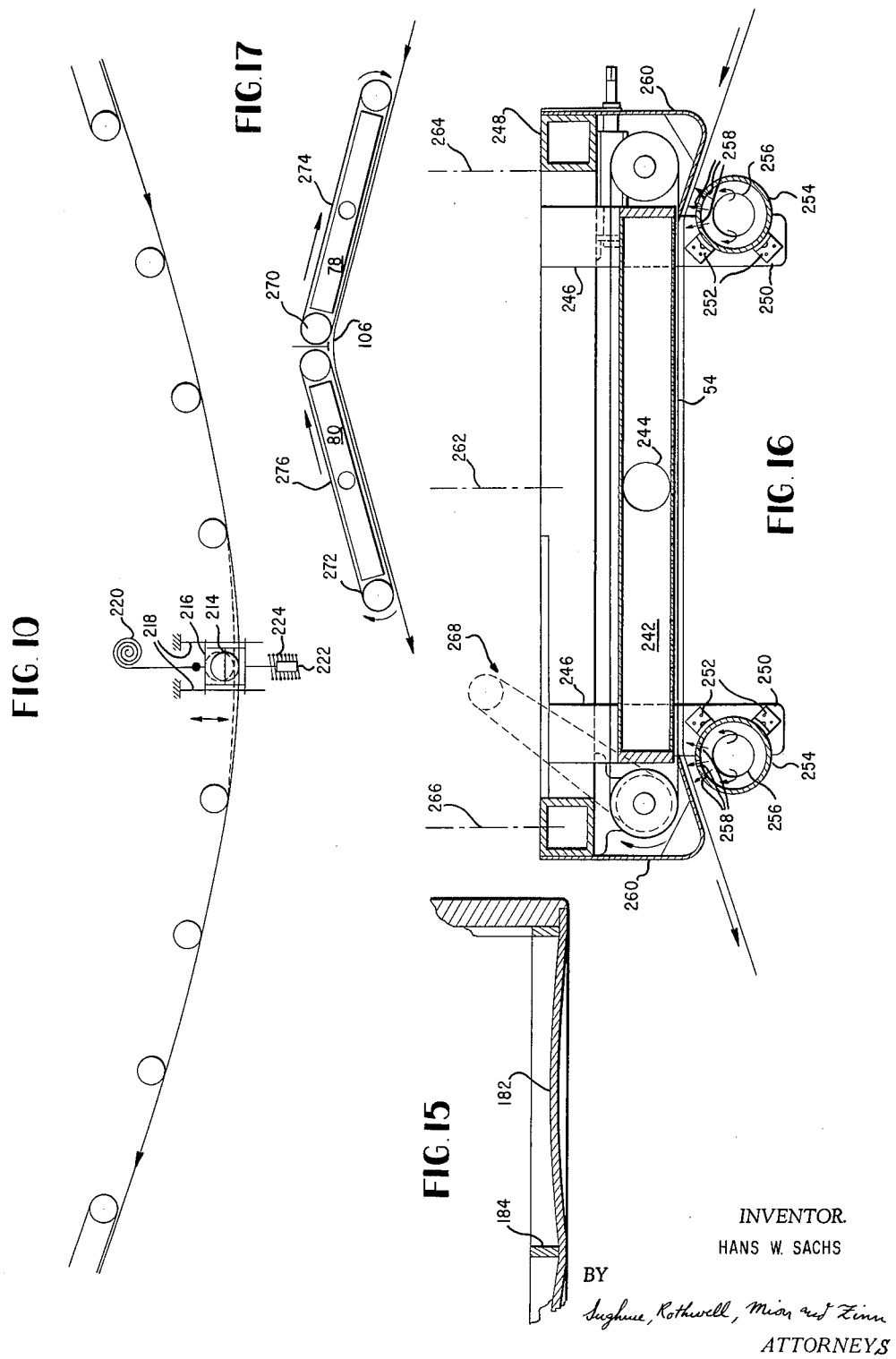

INVENTOR.
HANS W. SACHS
BY
Sughrue, Rothwell, Mion and Zinn
ATTORNEYS

Jan. 25, 1966  H. W. SACHS  3,230,634
ARTICULATED CATENARY RETURN DRYING TUNNEL WITH
TWIN SUCTION BLANKET DRIVE
Filed Oct. 11, 1962  8 Sheets-Sheet 8

INVENTOR.
HANS W. SACHS
BY
Sughrue, Rothwell, Mion and Zinn
ATTORNEYS

United States Patent Office 3,230,634
Patented Jan. 25, 1966

3,230,634
ARTICULATED CATENARY RETURN DRYING TUNNEL WITH TWIN SUCTION BLANKET DRIVE
Hans W. Sachs, 29 Virginia Ave., Binghamton, N.Y.
Filed Oct. 11, 1962, Ser. No. 229,887
25 Claims. (Cl. 34—52)

This invention relates to improvements in dryers and more particularly relates to a tunnel dryer of the air impingement type having a unique arrangement for supporting a return strand of a web being dried so that the strand assumes the shape of an articulated catenary.

In the prior art, the drying of paper webs has been accomplished in air impingement straight-away tunnel dryers and, with one exception, all dryers of this type have been built as one-way tunnels, without return. The exception consists of an air-borne return web; here, the web is supported on a cushion of air and while the method avoids contact of the coated web with rollers and other surfaces, it requires a highly critical balance of all conditions which must be met to keep the web in "floating" position.

There are several types of air impingement tunnel dryers designed to prevent contact with the coated side of the web and at the same time obtain a maximum drying length in a limited space. Examples of such types are circular dryers; single drum dryers; tower dryers with a single, vertical loop; spiral dryers; dryers arranged in multiple loops with the web running over rollers on top and the loop bottom formed and held by air blasts. All of these have serious shortcomings in one or more of the following respects: expensive construction; odd-shaped buildings required to house them; limited capacity; high web tension; critical balance conditions. Dryers in the form of tenter frames or conveyor dryers using grippers which engage the margin of the web are not suitable for webs having low strength such as wet paper.

Thus it can be seen that the support of a moving web, and especially a wet web without much strength, presents particular problems. The weight of the web itself creates high tensions in the web. In fact, if a web were allowed to hang in the shape of a catenary while it was stationary, the forces created by the weight of the web itself could, with certain parameters, cause the web to tear. With respect to the return of a coated web which has been turned over by 180 degrees so that the coated side faces down, supporting the web from various portions along the catenary and along the arc of the web without changing the configuration of the catenary does not reduce the catenary forces or the tensions in the web. An increase in the depth of the catenary would have some favorable features but in an installation of realistic dimensions stresses in the web would be close to the tensile and tear strength limits of the web material, and any advantages would be overcome by the increase in space required for the dryer.

This invention is based on the discovery that substantial relief in the tension of a web can be obtained by forming sectional catenaries taking full advantage of the available space. In other words, the web is supported so that it forms a plurality of catenaries or, stated another way, is zoned to provide an articulated catenary system. Between each end support of the web, there may be a plurality of nodal points dividing the web into a number of catenaries and at each of these nodal points a suction blanket assembly is utilized to support the web. This suction blanket assembly may include a single driven suction blanket contacting the top of the web and having two sections positioned at angles with respect to the direction of the web so that, as they contact and move the web, the web assumes its nodal point position, or it may take the form of two separate suction blankets being synchronously driven over two suction boxes angularly positioned with respect to each other.

The suction blanket assembly for supporting the web at the nodal points of the articulated catenary which forms the return strand is one of the essential features of this invention. The blanket assembly includes a means for moving the web into contact with the blanket and, importantly, means for aligning the web during its movement by pivotal support of the blanket assembly. For example, the blanket assembly may be mounted on a king pin positioned above the nodal point or may be mounted on a king pin located at one end of the blanket assembly and offset from the nodal point. In each case, suitable sensing means control further means for moving the blanket assembly about the pivot point to in turn control the direction of web feed at the nodal point. This web alignment means is not limited to a suction blanket assembly as described above, but may be generally applied to a single suction blanket supporting a moving web from either above or below.

The suction blanket assembly includes a suction box having a perforated cover and an endless blanket of a material, such as felt, having sufficient interstices to permit the passage of air, or alternately, a blanket having a plurality of perforations. To be most effective these perforations must be arranged in a particular pattern, as regards size, shape, and spacing of holes, which produces the best possible suction between the blanket and the suction box cover while holding the sliding friction between these two elements to a minimum. The suction box cover may also have a dished surface to increase the lateral air flow and reduce the contact area of the blanket therewith, thus further minimizing the friction created as the blanket slides over the cover.

It is also essential in such a system that the web tension be at all times maintained within predetermined limits. This may be done, for example, by regulating the drive roller and blanket speeds in accordance with signals derived from transducers associated with vertically movable control rollers located at the bottom of each catenary loop.

It is an object of this invention to provide an air impingement type tunnel dryer having an articulated catenary return tunnel with the moving web being supported at each nodal point by a suction blanket assembly.

It is a further object of this invention to provide such a dryer wherein the web may be automatically aligned by pivotal movement of the blanket assemblies and wherein a predetermined web tension may be automatically maintained by regulating the drive roller and blanket speeds.

Still another object of this invention is to provide a hydraulically actuated or other mechanical alignment means for a movable web supporting suction box assembly wherein a limited amount of web deviation is permissible without generating a correction signal.

These and other objects of this invention will be readily apparent to those skilled in the art from a consideration of the following description of several illustrative embodiments taken in conjunction with the drawings, in which:

FIGURE 1 is a sectional elevation view schematically illustrating the general arrangement of a drying tunnel with an articulated catenary support for a return run of a web being dried in forming the preferred embodiment.

Figure 4:
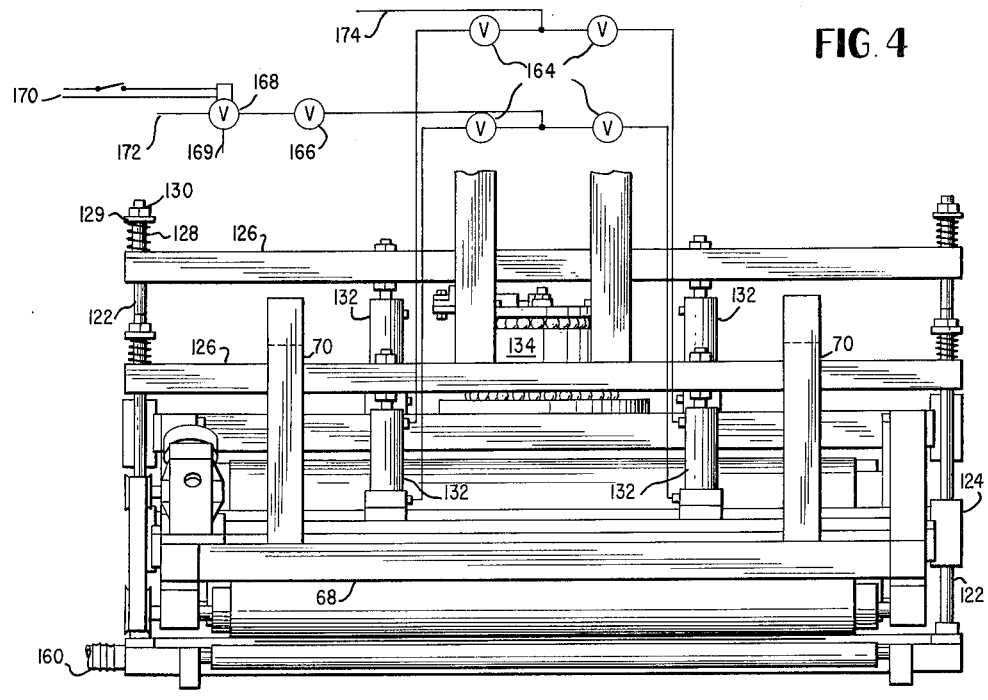
Figure 5:
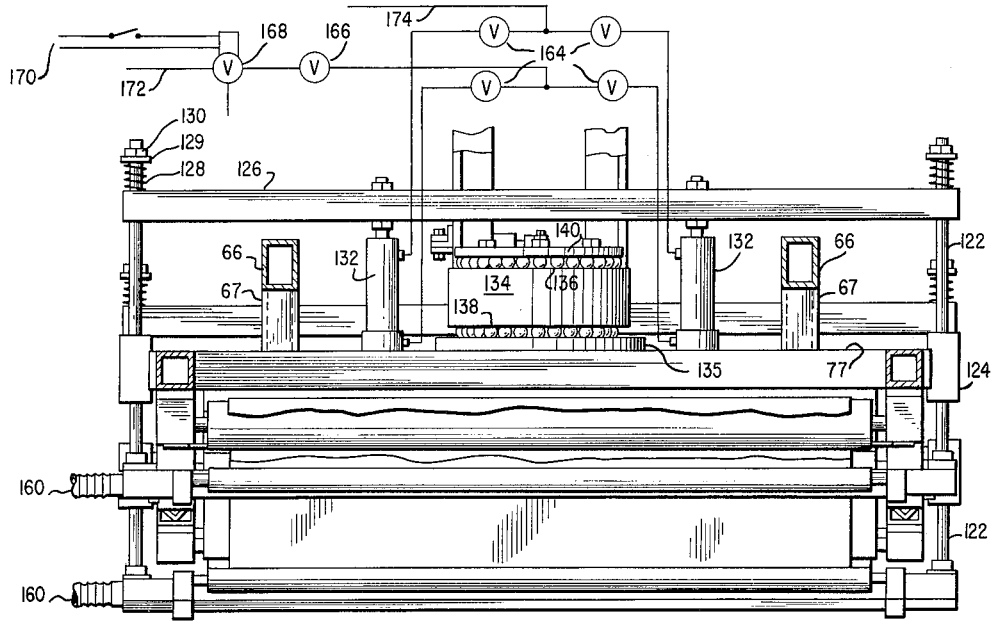
Figure 8:
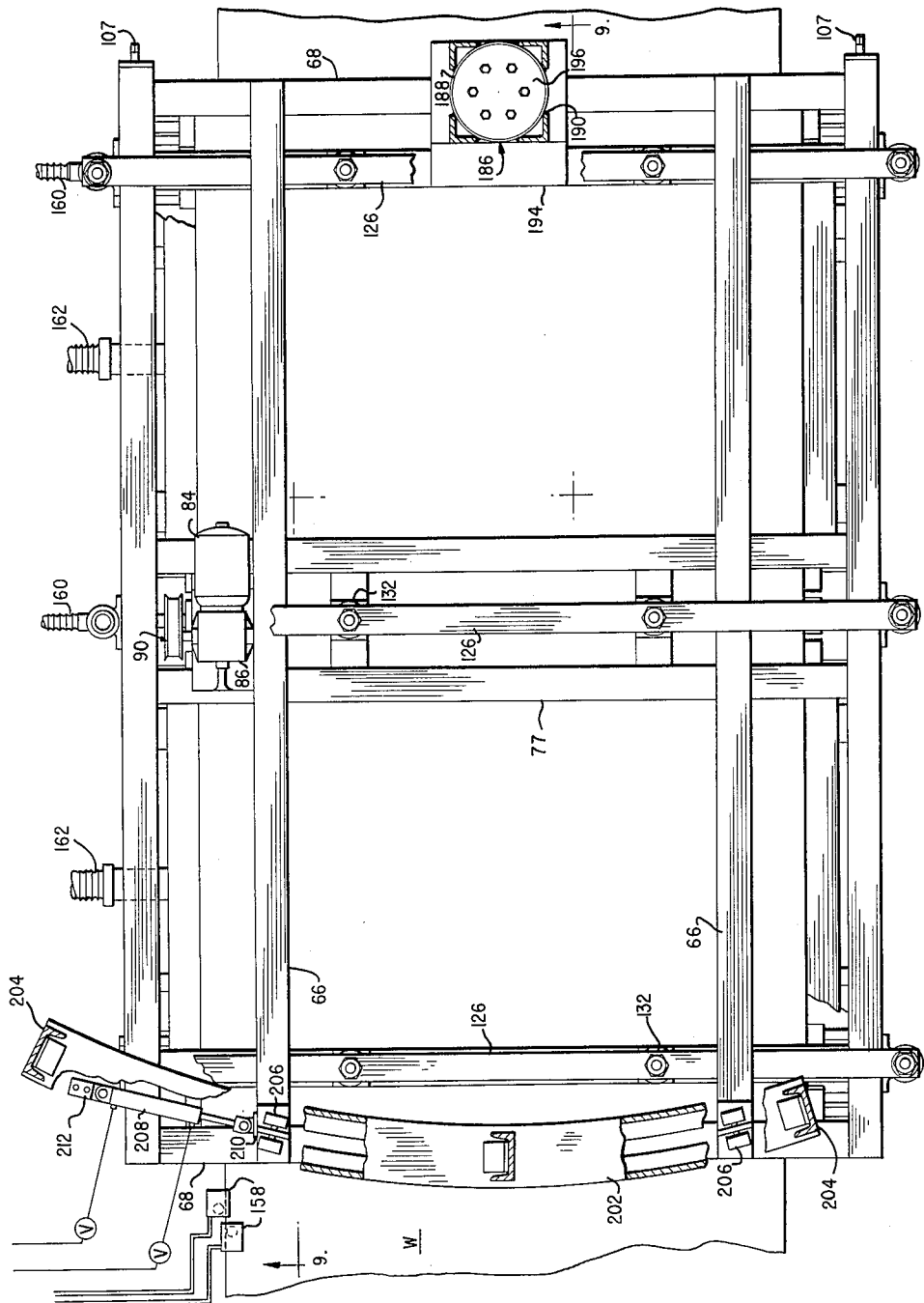
Figure 11:
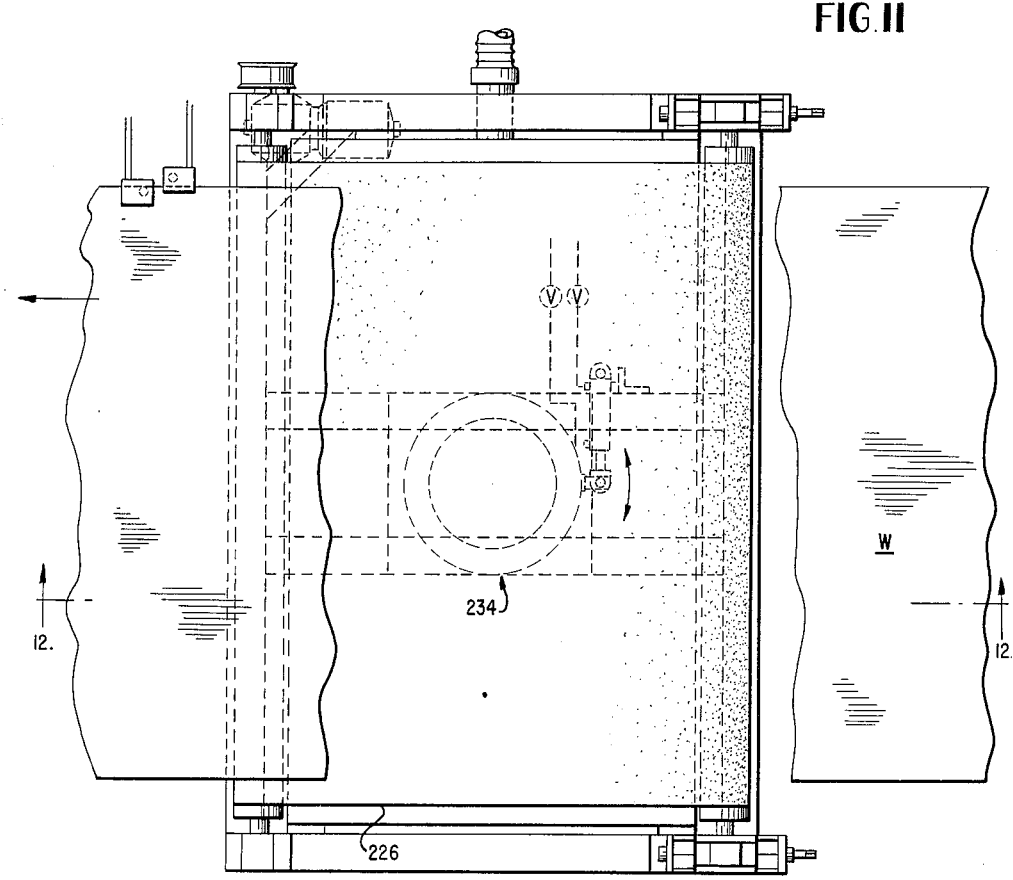
Figure 12:
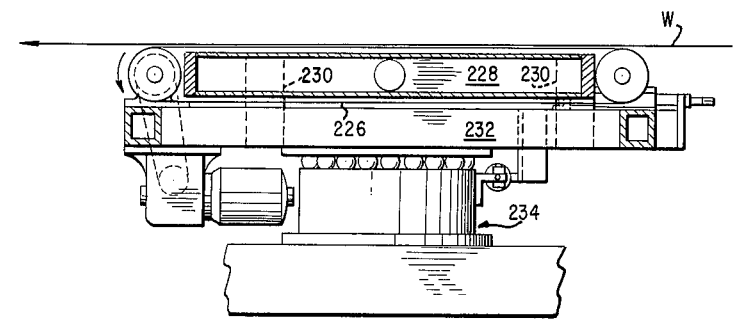
Figure 13:
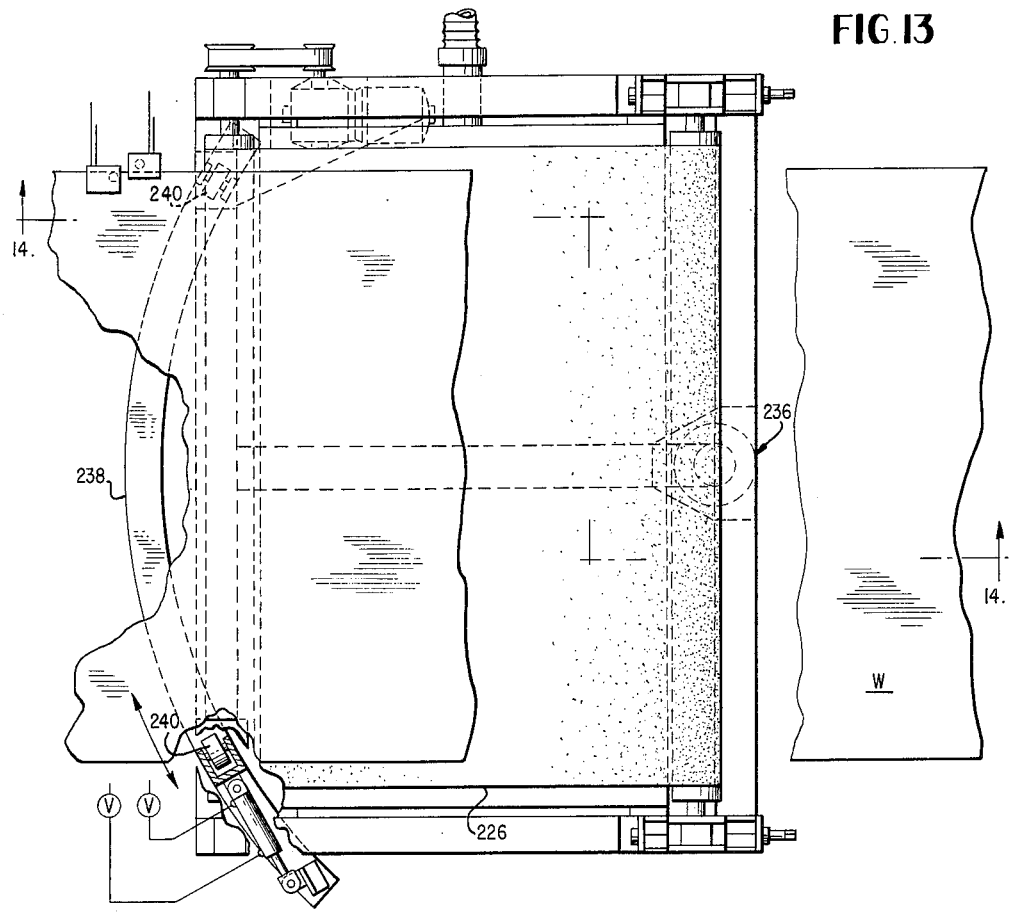
Figure 14:
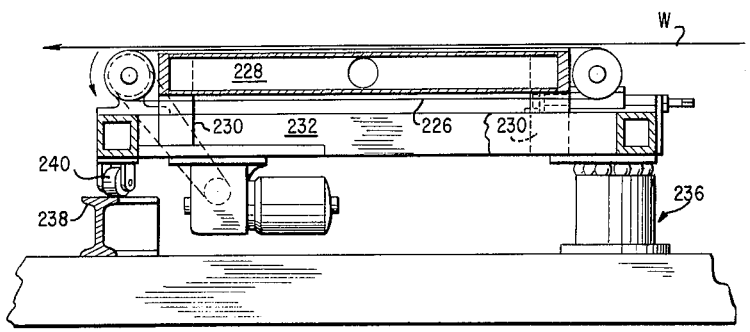

FIGURE 2 is an elevation view of a twin suction blanket drive assembly for the articulated catenary driving tunnel of FIGURE 1, FIGURE 3 is a top plan view of the twin suction blanket drive assembly shown in FIGURE 2, FIGURE 4 is an end elevation view of the twin suction blanket drive assembly shown in FIGURE 2, FIGURE 5 is a sectional elevation view taken along line 5—5 of FIGURE 2, FIGURE 6 is a sectional elevation view taken along line 6—6 of FIGURE 3, FIGURE 7 is a cross-sectional view of the suction box cover and blanket showing the perforations therein, FIGURE 8 is a top plan view of a modification of the twin suction blanket drive assembly showing an alternate alignment means construction, FIGURE 9 is a side elevation view of the modification shown in FIGURE 8, FIGURE 10 is an elevation view of a single catenary loop showing a tension control roller and transducer associated therewith, FIGURE 11 is a top plan view of a web alignment system using a single suction blanket, FIGURE 12 is a side elevation view of the web alignment system shown in FIGURE 11, FIGURE 13 is a top plan view of a modification of the single suction blanket alignment system shown in FIGURE 11, FIGURE 14 is a side elevation view of the web alignment system shown in FIGURE 13, FIGURE 15 is a cross sectional view of the suction box cover showing an additional modification thereto, FIGURE 16 is a cross sectional view of a single suction blanket and air blast tube assembly which may be used to support an articulated catenary return run of a web at its nodal points where the wet under-surface of the web is sufficiently solidified to permit the continued spaced application of high pressure air jets thereto, and FIGURE 17 is a simplified, cross sectional view of a twin suction box assembly employing two separate synchronously driven suction blankets.

Referring now to the drawings, FIGURE 1 shows the over-all construction of a drying tunnel assembly 10 to which this invention is applicable. More particularly, the drying tunnel assembly 10 includes an upper tunnel 12 shaped in a known manner as an arch or turtleback. Below the upper drying tunnel 12 is a lower or return drying tunnel 14.

A web W from a coating machine which may be a wet paper web with coating on one side thereof, is passed over a driven entrance roller 16 and is supported during its passage through the turtleback tunnel 12 by a plurality of support rollers 18, 18, etc. Some or all of these support rollers 18 may be driven slightly in excess of the web speed.

For drying the web by air impingement, the upper drying tunnel 12 is divided into a number of zoned air distributor sections 20, 20a, 20b and 20c. Since each of these sections is identical, only air distributor section 20 will be described in detail. This section has an air inlet 22 into which hot dry air or other drying gas is introduced into an inlet plenum chamber 24 wherein it passes out through lateral inlet slots or nozzles 26 to impinge on the coated surface of wet web W. The drying air effects uniform sweep across the web and passes into longitudinal return air slots 28 centrally arranged in the top of a return air collector 30 and then passes out through return air passage 32. The zones of the zoned air distributor may have different temperature drying air admitted thereto.

The web W after passing through the upper drying tunnel 12 passes around a driven roller 34 and is returned through the return drying tunnel 14. Return drying tunnel 14 is in turn divided into a number of zoned air distributor sections 36, 36a, 36b and 36c, all of which are identical.

The air inlet and air return passages in the zoned air distributors 36 are quite similar to those in zoned air distributors 20. The air is admitted through an inlet 38 into an inlet plenum chamber 40 and passes through lateral entrance slots or nozzles 42 to impinge upon and dry the web W and, after sweeping across the web, the drying air is passed through longitudinal slots 44 and return air collector 46 and is taken out through return air passage 48.

At a plurality of points in the return tunnel 14, the web is supported and is allowed to hang relatively free between these points. Actually, the web does not hang completely free but its tension is adjusted so that it is held in light contact with a plurality of idler rollers, as will be described later. The supports for the web are positioned at what may be termed nodal points to provide a zoned or articulated or sectional catenary. By providing a plurality of catenaries, substantial relief of the tension of the return strand may be obtained while still taking advantage of the available space.

Each of the suction blanket support assemblies 50 includes a support frame assembly 52 and a driven suction blanket 54 having two sections positioned at angles to one another as shown, so as to support the web W from above by suction applied through the blanket sections and to drive the web to generally a nodal point in the center of the blanket assembly 50. A plurality of air jets 58, 58 may be positioned below the blanket assembly 50 and are used for automatic threading of the web through the suction blanket assembly, for re-establishment of web contact with the blanket, and also for counteracting any possible tendency of the web to pull away from the blanket, at either end as well as in the center of the assembly. On both sides of blanket assemblies 50, 50a and 50b are idler rollers 51 positioned generally in the shape of a catenary above the path of the web as shown in FIG. 1. The blanket assembly 50 is the heart and essence of the mechanical features of this invention and will be described in detail in connection with FIGURES 2–7 and a modification of it will be described in connection with FIGURES 8–9.

After the web passes through the return tunnel 14, it is taken off by a pair of driven take-off rollers 60 and 62 and passed to a suitable rewind. All of the drive rollers for the tunnel arrangement shown in FIGURE 1 are synchronized for uniform web speed and web tension at the prevailing web length, taking into consideration web expansion and shrinkage. A further arrangement, to be described in connection with FIGURE 10, employs an oscillating control roller and transducer to regulate each suction blanket drive roller speed.

Referring now to the details of the suction blanket assembly shown in FIGURES 2–6, wherein like reference numerals designate like elements, a main frame 65 includes longitudinal beams 66 to the ends of which are secured dependent vertical supports 70. Cross beams 68 are provided, the end ones being in turn secured to the vertical supports 70. A blanket frame 72 includes side sections 74 and 76 which are secured to the cross beams 68 and a center section 77. The longitudinal beams 66 are also secured to the center section 77 by means of connecting posts 67. Suction boxes 78 and 80 are supported from the blanket frame 72 by brackets 82. A drive motor 84 rotates a blanket drive roller 92, supported by bearing bracket 94, through a transmission box 86, a drive pulley 88, and a timing drive belt 90. Idler rollers 96 and 100 and diverter roller 102 are supported at the nodal point by bearing bracket 98. A deflector shield 106, the underside of which may be covered with a low-friction material such as Teflon, is positioned beneath the diverter roller 102 to prevent the moving web from being drawn up into the diverter roller cavity. An end idler roller 104 is mounted in a takeup bearing 105 whose position may be adjusted, as by rotating the extension rod 107, to vary the suction blanket tension.

A king pin assembly 108 is suspended from vertical support beams 110 and includes a king pin 135, a king ring 134 to which the support beams 110 are secured, and a king pin cover 140. Ball thrust bearing 136 is positioned between the king pin cover 140 and the supporting ring 134, while similar bearing 138 is positioned between the supporting ring and the king pin. A king pin lever 142 is bolted to the cover 140 and is connected at its extended end to the piston rod clevis of a double acting hydraulic cylinder 144, the swivel extension of which is secured to one of the vertical support beams 110. The cylinder 144 controls the alignment of the moving web by rotating the entire suction blanket assembly about the center of supporting ring 134. The hydraulic cylinder 144 is supplied through attenuating valves 146 by hydraulic fluid lines 148 which communicate with a control transducer 150. The transducer contains a spring-opposed moving coil which shifts the hydraulic fluid supply to either cylinder end in response to web edge signals derived from photocells 158. The photocells are laterally spaced from each other a predetermined amount to permit a limited side shifting of the moving web without a correction signal being generated. The transducer is supplied with electrical power over lines 156 which also supply hydraulic fluid to the transducer through hydraulic fluid supply line 154 by energizing solenoid valve 152.

Another feature of this invention is the provision of starter rollers and air jet tubes for each suction blanket assembly. A central air jet and starter roller assembly 112 positioned directly beneath the web at the nodal point includes starter rollers 116 and air jet tube 117 having air jets 120 therein, all of which are mounted on supporting bracket 118. Similar starter roller and air jet assemblies 114 and 115 are provided at the outer ends of each suction blanket immediately beneath the moving web. Lift rods 122 are attached to these assemblies for raising and lowering them and are mounted for axial movement in double ball bushing guides 124 attached to the blanket frame 72. The rods 122 are resiliently connected to lift bars 126, and the balanced movement thereof in such a manner as to assure that the air jet and starter roller assemblies remain in full contact with the blanket is effected by means of compensating spring 128 acting between the lift bars and stop members 129, the stop members being secured to the lift rods by end nuts 130. The movement of the lift bars 126 is controlled by pneumatic cylinders 132 which are rigidly mounted between the blanket frame and the lift bars. The pneumatic cylinders are supplied via balancing valves 164 and attenuating valve 166 with compressed air from line 172. The air supply is regulated by a three-way solenoid valve 168, port 169 of which is an air release whose action is controlled by signals supplied to input lines 170. An open air intake and exhaust line is also provided as shown at 174. The balancing valves assure that each pair of pneumatic cylinders will operate in unison, once again to maintain the air jet and starter roller assemblies in full parallelity and full contact with the suction blanket. The air jet tubes are provided with flexible supply hoses 160 while each suction box is provided with a flexible vacuum hose 162.

FIGURE 17 shows in simplified form an alternate suction box assembly construction employing two separate, synchronously driven suction blankets. In this embodiment, two angularly positioned suction boxes 78 and 80 are provided with synchronously driven drive rollers 270 and 272 for advancing separate suction blankets 274 and 276 around their respective suction boxes in the directions shown. This arrangement eliminates the need for a diverter roller between the suction boxes and requires only a deflection shield 106.

Referring now to FIGURE 7, there is shown a cross-sectional view of a suction box cover 176 with a driven suction blanket 54 in sliding contact therewith. The suction box cover 176 contains a plurality of perforations or holes 178 which are dimpled at the outer surface to a well-rounded edge, to reduce frictional resistance between the cover and sliding blanket, while the flared enlargement of all the holes increases the sum total of cross-sectional area through which air can flow. The suction blanket 54 is also provided with a plurality of perforations 180, which it will be noted have smaller diameters and are more closely spaced than the suction box cover perforations 178. This is necessary to insure that as many perforations in the blanket as possible are in direct alignment or communication with holes in the cover.

A further modification of the suction box cover is shown in FIGURE 15 and consists of dishing sections of the suction box cover inwardly, as at 182, between a supporting grid structure 184. This has the effect of providing a large amount of lateral air flow between the suction box cover and the blanket such that perforations in the blanket which, at any given time are not in alignment or are only partially aligned with holes in the cover, still afford flow of air to the interior of the suction box. The dishing of the suction box cover also reduces the magnitude of the contact area between the suction box cover and the moving blanket thus lowering the sliding friction between the two, the number and size of such dishes being determined by the flexibility and tension of the suction blanket.

In operation, the wet web W coming from a coating machine is passed over the driven entrance roller 16 and advanced through the upper drying tunnel arch or turtleback 12 where the zoned air distributor sections 20, 20a, 20b, and 20c direct streams of drying air onto the web through the lateral inlet slots or nozzles 26. The web is then fed around the driven return roller 34 and into the lower drying tunnel 14, where similar charges of drying air are directed against the wet surface of the web in zoned air distributor sections 36, 36a, 36b and 36c, through slots or nozzles 42. To start the web through the suction blanket assemblies at each nodal point either when initially threading the web when its leading end is introduced below roller 104 of the blanket assembly, or when starting the dryer already threaded with the web or a leader if used, the pneumatic cylinders 132 are actuated to raise the air jet and starter roller assemblies 112, 114 and 115. The starter rollers and air jets urge the advancing web into initial contact with the suction blankets, which are being driven by rollers 92. After the web has been brought into complete contact with the suction blanket, the air jet and starter roller assemblies are lowered out of contact through the reverse action of the pneumatic cylinders. The air supply to the jet tubes may be shut off, or the air jets may be maintained during operation. The balancing valves 164, the double ball bushing guides 124, and the compensating spring assemblies 128–130 are all effective to maintain the air jet and starter roller assemblies in a strictly aligned position during the movement thereof and to obtain uniform contact between the starter rollers and the blanket. The dried web W is then fed out through the driven take-off rollers 60, 62 and may be conveyed to a further coating machine or a rewinding machine, for example.

If at any time the lateral web movement as the web arrives at a given suction blanket assembly exceeds the predetermined limits defined by the position of the photocells 158, a correction signal will be supplied to the transducer 150 which will in turn cause the actuation of hydraulic cylinder 144 in such a manner as to rotate the entire suction blanket assembly 50 about the center of supporting ring 134 so as to effect a realignment of the moving web W within the set boundaries.

Referring now to FIGURES 8 and 9, there is shown an alternate embodiment of the king pin suspension and hydraulic alignment system applied to the same suction blanket assembly described above. Since many of the structural elements in the embodiment of FIGURES 8 and 9 correspond to those shown in the embodiment of FIGURES 2 through 7, the same reference numerals have been used to designate such elements where applicable. In this embodiment a king pin assembly 186 includes a king pin supporting ring 188 which is rigidly suspended from vertical support beams 190. A king pin 192 is attached to a mounting bracket 194 which is in turn attached to the frame cross beams 68. The king pin is rotatably mounted in the support ring by means of king pin cover 196 and ball thrust bearings 198, 200. The opposite end of suction blanket assembly is mounted for lateral travel along an arcuate trolley track 202. The trolley track is rigidly mounted to the vertical support beams 204. Two sets of trolley rollers 206 are mounted on the longitudinal beams 66 and ride in the trolley track 202. A double acting hydraulic cylinder 208 has a piston rod clevis secured to the main frame by tie bracket 210 and a swivel extension secured to the track by pivot bracket 212. Thus, it will be seen that when the photocells 158 sense an excessive lateral movement of the running web W a correction signal will be generated to cause the actuation in the proper direction, of the hydraulic cylinder 208. This will in turn rotate the entire suction blanket assembly on the trolley rollers 206 about the center of supporting ring 188 to effect the proper realignment of the moving web W. It should be noted that the king pin assembly 186 in this embodiment is much smaller than that shown in FIGURES 2 through 7. This reduction of size is possible because in this embodiment the king pin only supports half of the suction blanket weight, the other half being supported by the trolley track 202 through the trolley rollers 206.

An additional variation is seen in this embodiment in that the suction blanket drive is now applied through the diverter roller 102. This has the advantage of providing a greater frictional contact between the driving roller and the suction blanket, since the outer surface of the suction blanket, which is now in contact with the driving diverter roller 102, has a much rougher texture than the inner surface thereof. The inner surface of the suction blanket must be kept reasonably smooth to minimize the sliding friction between the suction box covers 176 and the moving blanket 54.

This embodiment has the advantage of effecting rotation of every point of the blanket in the same direction in which web alignment correction is required. This is in contrast to the alignment correction effected by the embodiment of FIGURES 2 through 7, wherein all points on the first half of the blanket move in a direction opposite to that in which web alignment correction is required, thus forcing the web initially in the direction of misalignment, whereafter the lateral tension forces created in the web will cause the web to return to its initial position and then follow the oblique direction in which the web is traveling.

Referring now to FIGURE 10, there is shown a speed regulating means for a suction blanket drive motor that is responsive to the moving web tension, as indicated by the web contour or sag between adjacent idler rollers at the bottom of a catenary loop. The regulating means includes a tension control roller 214 mounted in oscillating bearing blocks 216 which are vertically movable on guide rods 218. A balancing spring 220, shown here as a negator spring, is attached to the bearing blocks, the effect of which may be adjusted by variably controlling the effective weight of the tension control roller 214 and the oscillating bearing blocks 216, such as by the attachment or removal of weights. Also attached to the bearing blocks is a reactor core 222 which is movable in the stationary induction coil 224 of a control transducer. The signals generated by this transducer may be employed in servo loop fashion to regulate the driving motor speed of the next suction blanket assembly through which the moving web W will pass in such a manner as to cause the web W to lightly contact each idler roller defining the catenary loop.

It is to be understood that the principle of moving web alignment by rotation of a driven suction blanket is not restricted to a catenary arrangement nor to the use of "inverted" blankets, as shown in FIGURES 2 through 9, but may be equally well employed with single, "upright" suction blankets. Such an application is shown in FIGURES 11 through 14, wherein a driven suction blanket 226 passes over the perforated cover on top of a single suction box 228, which is supported by brackets 230 on a blanket frame 232. The embodiment of FIGURES 11 and 12 shows the king pin assembly 234 mounted in the center of the blanket frame, corresponding to the arrangement described above with respect to FIGURES 2 through 7. The hydraulic cylinder, photocell mountings, and drive motor assemblies are similar to those shown in FIGURES 2 through 7 and therefore need not be described in detail.

The embodiment shown in FIGURES 13 and 14 features a smaller king pin assembly 236 rotatably mounted at the web entrance end of the suction blanket and an arcuate roller track 238 mounted at the exit end for trolley rollers 240, which are mounted on the blanket frame, to ride on, and corresponds to the web alignment arrangement described above in conjunction with FIGURES 8 and 9.

In the event that the web coating is sufficiently dry or otherwise insensitive enough to withstand the continuous, spaced application of high pressure air jets, the inverted, single suction blanket and air blast tube assembly shown in FIGURE 16 may be used to support the return run of the web through the lower drying tunnel 14 at the nodal points.

Referring to FIGURE 16, there is shown a suction box 242 provided with a vacuum outlet 244 and supported by brackets 246 from a blanket frame 248. Mounted on the bracket extensions 250 by angle clips 252 are blast tubes 254 having air inlets 256 and air outlet jets 258. Angularly positioned Teflon faced web guides 260 are mounted at each end of the blanket frame 248. The motor drive and king pin arrangements, repeatedly shown in prior figures, have not been repeated in detail. Instead, broken line 262 represents the location of the center king pin, or, if the alternative arrangement is used, broken lines 264 and 266 represent the location of the end king pin and trolley rollers respectively. The motor drive assembly, shown for an end king pin arrangement, is indicated generally at 268.

In this embodiment, the blast tubes 254 are supplied with high pressure conditioned air, such as used in the drying zones, which urges the moving web W against the guides 260 and blanket 54 as it escapes through the outlet jets 258. The blast tubes are necessary to this situation to prevent the web from "peeling" away from the suction blanket.

While several preferred embodiments of this invention have been described above, it is to be understood that minor changes and modifications therein will be readily apparent to those skilled in the art. Accordingly, the scope of this invention is to be limited only by the following claims.

I claim:
1. An air impingement drying apparatus for a running length wet web comprising; means for contacting a running length of a wet web with a drying gas, at least three moving support means, all of which are driving means for the web, for supporting the running web at spaced positions of the dryer so that the length of the web between the support means assumes the shape of a catenary as the web is moving, at least the middle one of the three moving support means positioned to support and supporting the running web from above, and means to sense variations of tension in the web between supports to control the driving means.

2. A drying apparatus as defined in claim 1 wherein at least the middle one of the three support means includes a driven suction blanket assembly having two sections positioned at angles to one another to support the web from above in the shape of at catenary, and means mounting the blanket assembly so that it is bodily movable to effect alignment of the running web.

3. A drying apparatus as defined in claim 2 wherein the means to mounting the suction blank assembly includes vertical pivot means about which the suction blanket assembly is rotatable to effect alignment of the running web.

4. A drying apparatus as defined in claim 3 including sensing means positioned so as to sense the edge of the running web, a controllable reaction member mounted between the pivot means and the suction blanket assembly and operable to effect rotation of the suction blanket assembly about the pivot means, and a control transducer for controlling the operation of the reaction member in response to signals derived from the sensing means.

5. A drying apparatus as defined in claim 3 wherein the vertical pivot means is disposed at one end of the suction blanket assembly and including a laterally disposed arcuate track on which the other end of the suction blanket assembly rides.

6. A drying apparatus as defined in claim 5 including sensing means positioned so as to sense the edge of the running web, a controllable reaction member mounted between a stationary point and the suction blanket assembly and operable to effect rotation of the suction blanket assembly about the pivot means, and a control transducer for controlling the operation of the reaction member in response to signals derived from the sensing means.

7. A drying apparatus as defined in claim 2 wherein the suction blanket assembly includes a driven suction blanket, and air jet and roller means positioned below the running web and mounted for controlled vertical movement in such a manner as to assist the raising of the web into contact with the driven suction blanket.

8. A drying apparatus as defined in claim 2 wherein the suction blanket assembly includes two suction boxes having perforated covers, and a driven perforated suction blanket, the perforations in the covers and blanket being of dissimilar size and pattern whereby suction therebetween is always maintained.

9. A drying apparatus as defined in claim 8 wherein the suction box covers are sectionally dished inwardly to promote lateral air flow between the covers and the driven suction blanket and to reduce the sliding friction between the covers and the driven suction blanket.

10. A drying apparatus as defined in claim 2, wherein the means to sense variations in tension in the web includes oscillating control roller means positioned at the bottom of a caternary loop and responsive to the running web tension for controlling the speed of the driven suction blanket assembly in accordance therewith.

11. An air impingement drying apparatus for a running length wet web comprising:
 (a) a drying tunnel for the web,
 (b) means for directing drying air against the wet surface of the running web within the drying tunnel,
 (c) a plurality of suction blanket assemblies spaced along the drying tunnel and arranged so as to support the running web from above nodal points so that the lengths of the running web between the suction blanket assemblies assume the shape of a caternary, and
 (d) speed regulated driving means operable in response to sensed caternary shape for driving the suction blanket assemblies to advance the running web through the drying tunnel.

12. A drying apparatus as defined in claim 11 wherein each suction blanket assembly includes:
 (a) a vertical king pin assembly about which the suction blanket assembly is rotatable to effect edge alignment of the running web,
 (b) two laterally displaced photocells mounted adjacent the edge of the running web to sense the position thereof,
 (c) a double acting hydraulic cylinder assembly mounted between the king pin assembly and the suction blanket assembly, and
 (d) control means responsive to signals from the photocells for operating the hydraulic cylinder to effect rotation of the suction blanket assembly about the king pin assembly, whereby the running web edge alignment is automatically corrected if it exceeds the predetermined limits defined by the lateral displacement of the photocells.

13. A driven suction blanket assembly for supporting a running web from above comprising:
 (a) suction box means having entrance and exit paths defined by its lower profile and positioned at an angle of less than 180 degrees with respect to each other,
 (b) blanket means fitted over the suction means, and
 (c) drive means for advancing the blanket means around the suction means whereby a web contacting the blanket means is held thereby and advanced through the suction blanket assembly over an angled path conforming to the lower profile of the suction means.

14. A driven suction blanket assembly as defined in claim 13 wherein the suction box means comprises two suction boxes angularly positioned with respect to each other, the blanket means comprises two endless blankets, one being fitted over each suction box and the drive means comprises two synchronously driven drive rollers.

15. A driven suction blanket asssembly as defined in claim 13 wherein the suction box means comprises two suction boxes angularly positioned with respect to each other, the blanket means comprises an endless blanket, and further including a diverter roller located at the nodal point between the two suction boxes for guiding the blanket out of contact with the running web at this point.

16. A driven suction blanket assembly as defined in claim 15 wherein the diverter roller also serves as a drive roller for the drive means.

17. A driven suction blanket assembly for supporting a running web and having entrance and exit ends comprising:
 (a) a continuous length perforated suction blanket,
 (b) two suction boxes having perforated covers and positioned at angles with respect to each other around which the suction blanket is fitted,
 (c) a driving roller mounted at the exit end of the suction box assembly for advancing the suction blanket around the suction boxes,
 (d) first idler rollers mounted at the nodal point of the angularly positioned suction boxes for guiding the suction blanket into contact with the suction box covers,
 (e) a second idler roller positioned at the entrance end of the suction box assembly,
 (f) adjustable bearing means mounting the second idler roller for regulating the tension of the suction blanket, and
 (g) speed regulated driving means for rotating the driving roller whereby a running web contacting the suction blanket is supported and advanced thereby along a predetermined angular path defined by the positions of the suction boxes.

18. A suction blanket assembly as defined in claim 17 including:
 (a) vertical pivot means about which the suction blanket assembly is rotatable to effect edge alignment of the running web,
 (b) two laterally displaced sensing elements mounted adjacent the edge of the running web to sense the position thereof,
 (c) an expansible reaction member mounted between the pivot means and the suction blanket assembly and operable to effect rotation of the suction blanket assembly about the pivot means, and
 (d) control means for controlling the operation of the reaction member in response to signals derived from the sensing elements.

19. A suction blanket assembly as defined in claim 17 wherein the running web is supported from above including air jet and roller means positioned below the running web and mounted for controlled vertical movement in such a manner as to assist the raising of the web into contact with the driven suction blanket.

20. A suction blanket assembly as defined in claim 17 wherein the perforations in the suction box covers and the suction blanket are of dissimilar size and pattern to always maintain suction therebetween and wherein the suction box covers are sectionally dished inwardly to promote lateral air flow between the covers and the driven suction blanket and to reduce the sliding friction between the covers and the driven suction blanket.

21. A running web edge alignment apparatus for a driven suction blanket assembly comprising:
 (a) vertical pivot means about which the suction blanket assembly is rotatable,
 (b) sensing means mounted adjacent the edge of the running web to sense the position thereof, the sensing means being operable to generate a correction signal if the edge of the web strays a predetermined amount from its normal path,
 (c) controllable reaction means mounted between the pivot means and the suction blanket assembly, and
 (d) control means responsive to signals from the sensing means for operating the reaction means to effect rotation of the suction blanket assembly about the pivot means whereby the running web edge alignment is automatically corrected if the web strays a sufficient amount to cause the sensing means to generate a correction signal.

22. A running web edge alignment apparatus for a driven suction blanket assembly comprising:
 (a) vertical pivot means about which the suction blanket assembly is rotatable,
 (b) two laterally displaced sensing elements mounted adjacent the edge of the running web to sense the position thereof,
 (c) a double acting expansible reaction member mounted between the pivot means and the suction blanket assembly, and
 (d) control means responsive to signals from the sensing elements for operating the reaction member to effect rotation of the suction blanket assembly about the pivot means whereby the running web edge alignment is automatically corrected if it exceeds the predetermined limits defined by the lateral displacement of the sensing elements.

23. A running web edge alignment apparatus for a driven suction blanket assembly comprising:
 (a) vertical pivot means disposed at one end of the suction blanket assembly and about which the suction blanket assembly is rotatable,
 (b) an arcuate track mounted at the other end of the suction blanket assembly and on which the said other end of the suction blanket assembly rides during rotation thereof,
 (c) sensing means mounted adjacent the edge of the running web to sense the position thereof, the sensing means being operable to generate a correction signal if the edge of the web strays a predetermined amount from its normal path,
 (d) controllable reaction means mounted between a stationary point and the suction blanket assembly, and
 (e) control means responsive to signals from the sensing means for operating the reaction means to effect rotation of the suction blanket assembly about the pivot means whereby the running web edge alignment is automatically correcteed if the web strays a sufficient amount to cause the sensing means to generate a correction signal.

24. A running web edge alignment apparatus for a driven suction blanket assembly comprising:
 (a) vertical pivot means disposed at one end of the suction blanket assembly and about which the suction blanket assembly is rotatable,
 (b) an arcuate track mounted at the other end of the suction blanket assembly and on which the said other end of the suction blanket assembly rides during rotation thereof,
 (c) two laterally disposed sensing elements mounted adjacent the edge of the running web to sense the position thereof,
 (d) a double acting expansible reaction member mounted between a stationary point and the suction blanket assembly, and
 (e) control means responsive to signals from the sensing elements for operating the reaction member to effect rotation of the suction blanket assembly about the pivot means, whereby the running web edge alignment is automatically corrected if it exceeds the predetermined limits defined by the lateral displacement of the sensing elements.

25. A driven suction blanket assembly for supporting a running web from above and having entrance and exit ends comprising:
 (a) a suction box having a perforated cover,
 (b) an endless suction blanket fitted around the suction box,
 (c) a driving roller mounted at one end of the suction blanket assembly for advancing the suction blanket around the suction box,
 (d) guide means mounted at the entrance and exit ends of the suction blanket assembly for directing the web into and out of the suction blanket assembly, and
 (e) movable air blast tubes positioned beneath the web at the entrance and exit ends of the suction blanket assembly for urging the web into contact with the guide means and the suction blanket.

References Cited by the Examiner

UNITED STATES PATENTS

| | | | |
|---|---|---|---|
| 1,308,951 | 7/1919 | Jacobs | 34—157 |
| 1,951,004 | 3/1934 | Willis | 34—159 |
| 1,954,098 | 4/1934 | Powers | 226—170 |
| 2,283,699 | 5/1942 | Richardson | 34—52 |
| 3,091,794 | 6/1963 | Pillsbury | 226—97 |

FOREIGN PATENTS 410,859   5/1934   Great Britain.

WILLIAM F. O'DEA, *Acting Primary Examiner.*

NORMAN YUDKOFF, *Examiner.*